United States Patent [19]

Hicks

[11] Patent Number: 6,026,300

[45] Date of Patent: *Feb. 15, 2000

[54] METHOD FOR SERVICE ACQUISITION AFTER A CALL RELEASE IN A DUAL MODE MOBILE TELEPHONE

[76] Inventor: Scott Gordon Hicks, 1316 Red Twig Rd., Apex, N.C. 27502

[*] Notice: This patent issued on a continued prosecution application filed under 37 CFR 1.53(d), and is subject to the twenty year patent term provisions of 35 U.S.C. 154(a)(2).

[21] Appl. No.: 08/904,025

[22] Filed: Jul. 31, 1997

[51] Int. Cl.[7] .................................................. H04B 1/00
[52] U.S. Cl. .............................................. 455/434; 455/552
[58] Field of Search .................................... 455/434, 552, 455/553, 450, 515

[56] References Cited

U.S. PATENT DOCUMENTS

| | | |
|---|---|---|
| 5,119,397 | 6/1992 | Dahlin et al. . |
| 5,420,911 | 5/1995 | Dahlin et al. . |
| 5,794,147 | 8/1998 | Huang ........................................ 455/434 |
| 5,797,096 | 8/1998 | Lupien et al. ............................. 455/553 |
| 5,809,427 | 9/1998 | Perrault et al. ........................... 455/450 |
| 5,845,215 | 12/1998 | Henry et al. .............................. 455/553 |
| 5,924,026 | 7/1999 | Krishnan ................................... 455/414 |

*Primary Examiner*—Reinhard J. Eisenzopf
*Assistant Examiner*—Makoto Aoki
*Attorney, Agent, or Firm*—Coats & Bennett, P.L.L.C.

[57] ABSTRACT

A method for service acquisition after call release in a dual mode mobile telephone relies upon protocol versions data stored in the mobile telephone to determine whether a digital control channel is available. Each time the mobile telephone is assigned by the base station to a new traffic channel, whether during call establishment or during a hand-off, the mobile telephone stores protocol version data which is broadcast on the newly assigned channel. After a call release, the mobile telephone uses the stored protocol version data to determine whether a digital control channel is available in the channel band occupied by the last used communications channel. If no digital control channel is available, the mobile station will scan for a suitable analog control channel and acquire service immediately on the analog control channel without waiting for a pointer to a digital control channel.

11 Claims, 3 Drawing Sheets

METHOD FOR SERVICE ACQUISITION AFTER A CALL RELEASE IN A DUAL MODE MOBILE TELEPHONE

BACKGROUND OF THE INVENTION

Analog cellular telephone systems have been long established in the United States. The advanced mobile phone service (AMPS) system which is still is widespread use today, was developed in the early 1970s. Frequency division multiple access (FDMA) is used in the AMPS system to provide shared access to the available spectrum. With FDMA, users are assigned to a channel from a limited set of channels in the available spectrum. In the AMPS system, 25 kHz channels are used whose carriers are separated by 30 kHz. The number of available channels is therefore limited by the available spectrum. When a user places a call, the user is assigned to one of the available channels. If no channel is available, the user's call is blocked. Unfortunately, the increasing demand for cellular services has resulted in a corresponding increase in the frequency of call blocking, particularly in congested urban areas.

Recent advances in digital communications allow for an increase in network capacity without requiring allocation of additional spectrum. Digital communication systems use time division multiple access (TDMA) or code division multiple access (CDMA) to allow multiple users to share the same carrier thereby increasing network capacity. In a TDMA system, for example, a single RF carrier is divided into time frames of a pre-defined length. Each time frame is further divided into plural time slots, each time slot representing a separate channel. A plurality of users can transmit and receive data in short bursts in respective time slots. Thus, a plurality of users can share a single carrier.

Another advantage of digital systems is the improvement in voice quality. In an analog system, physical influences or disturbances in radio transmission links are sometimes passed into the audio path of the receiver. The results are static, hums, hisses, crackling sounds, cross-talk and fade-outs in the received voice signal. In digital communication systems, the audio signal is transformed into digital data patterns called bits or bit patterns. Digital coding and error correction methods allow the analog signal to be reconstructed at the receiving end of the transmission. Digital signal processing techniques eliminate many of the effects of disturbances in the radio transmission link. Digital control of mobile phones also has advantages including longer battery life, short-message services, hierarchical cell structures, and private/residential service.

Because of the advantages of digital communication's techniques, there has been a move to replace existing analog cellular systems in favor of digital cellular systems. However, there is a huge investment of resources in the current analog infrastructure and it is not practical to completely abandon existing analog systems. Moreover, there are millions of existing analog-only mobile phones in use which require analog infrastructure to operate. The transition to digital systems will likely take many years or decades. Consequently, it can be expected that cellular services in the U.S. will consist of a mixture of analog and digital systems.

The IS-136 standard has been developed for dual mode cellular telephones which are operable in either an analog or a digital communications mode. In general, it is desirable to operate in a digital communication mode when digital services are available. When an attempt is made to acquire cellular services by a dual mode mobile telephone in a channel range where both analog and digital control channels are available, the mobile telephone will first search for a suitable analog control channel. After finding a suitable analog control channel, the mobile phone will wait for a digital channel pointer. The digital channel pointer is a pointer which directs the mobile phone to a digital control channel. Since digital services is preferred, the mobile phone will wait for a channel pointer before acquiring service on an analog control channel. If no pointer information is received after a predetermined period of time, the mobile telephone will acquire service on an analog control channel. Thus, in a dual mode phone, delay while waiting for a channel pointer to a digital control channel increases substantially the amount of time it takes to acquire service on a control channel and thus be able to send and receive messages.

SUMMARY OF THE INVENTION

The present invention provides a method for service acquisition for dual mode wireless devices after call releases which reduces the amount of time it takes to establish a call in an analog-only control channel wireless system. Prior to a call release, the mobile station stores the protocol version of the current traffic channel. The protocol version is transmitted from the base station to the mobile station as part of a mobile station control message on both analog and digital voice channels. The protocol version information is used by the mobile station to determine what signaling protocols are used to communicate with the base station.

By storing the protocol version of the current channel after each call release, the time it takes to establish the next call can be substantially reduced if the mobile station is currently within an analog-only control channel wireless system. When the mobile station attempts to acquire cellular services after a call release, the mobile station examines the protocol version of the last voice channel used which is stored in its memory. The mobile station uses the protocol version to determine the system capabilities corresponding to the last voice channel. If the protocol version indicates that the last voice channel was not in a digital control channel coverage area, then the mobile station will scan analog control channels and will immediately acquire service once a suitable analog control channel is found. The mobile unit will not wait for digital control channel pointer on the analog control channel. If at a later time, the analog control channel overhead stream contains digital control channel information, then the mobile station will use that information to acquire service on the digital control channel.

The present invention may substantially reduce the service acquisition time in a dual mode cellular telephone after a call release. If the cellular telephone is not within a digital control channel coverage zone, it will not wait for a channel pointer on the analog control channel, but will instead immediately acquire service on the analog control channel. By immediately acquiring service on the analog control channel, the total acquisition time can be reduced by 5 to 7 seconds in an analog-only coverage area. In areas where there is DCCH coverage, the present invention does not have any significant effect on service acquisition time.

DETAILED DESCRIPTION OF THE INVENTION

Figure 1:
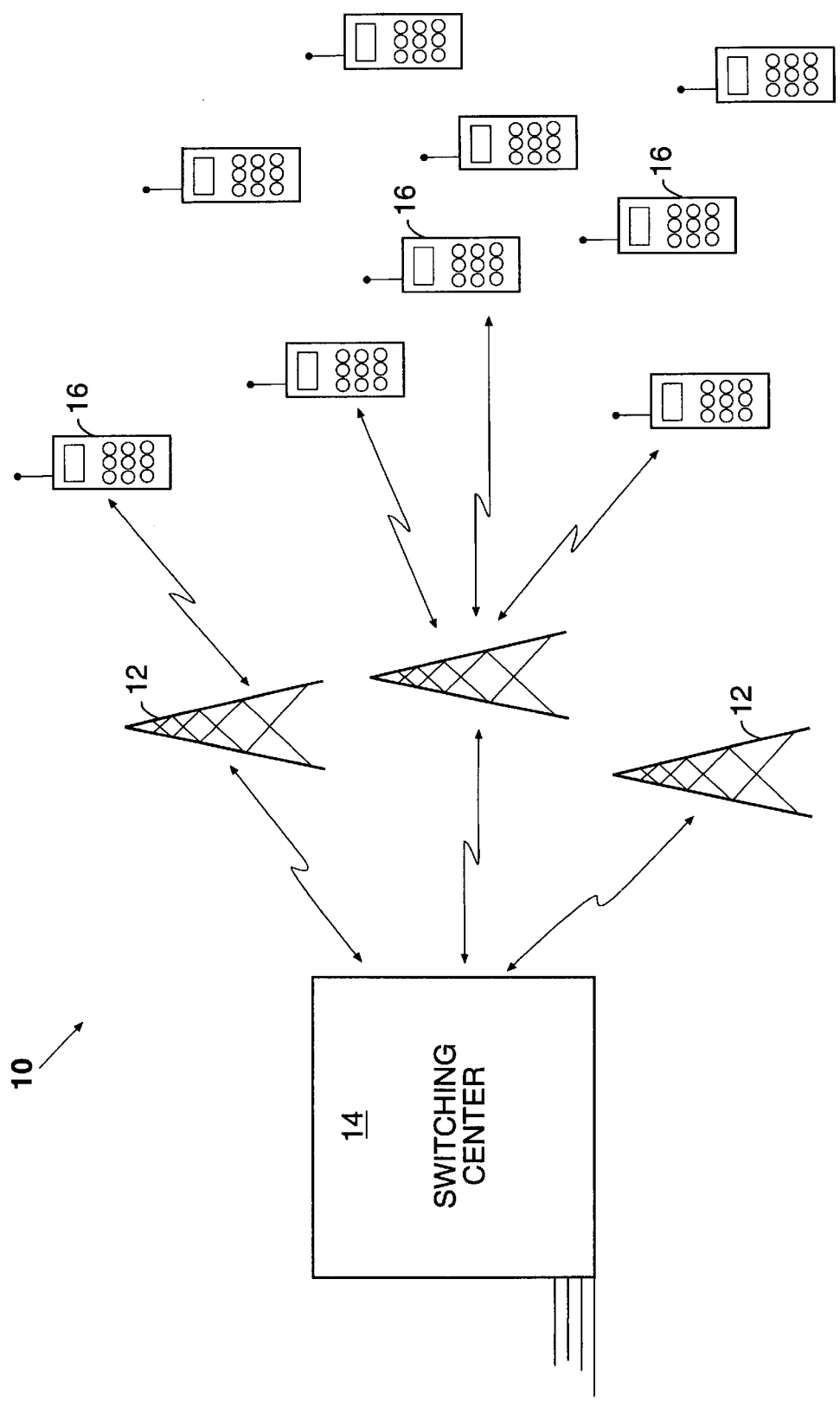
FIG. 1 is a schematic illustration of a mobile communication system.

Referring now to the drawings, the service acquisition method of the present invention will be described. The service acquisition method of the present invention is used in a mobile cellular system as shown in FIG. 1. The mobile cellular system, which is indicated generally by the numeral 10, comprises a plurality of base stations 12 which are connected via a switching center 14 to a terrestrial communications network such as the Public Switched Telephone Network (PSTN). Each base station 12 is located in and provides service to a geographic region referred to as a cell. In general, there is one base station 12 for each cell within a given system. Within each cell, there may be a plurality of mobile stations 16 which communicate via radio link with the base station 12. The base station 12 allows the user of the mobile station 16 to communicate with other mobile stations 16, or with other users connected to the PSTN. The switching center 14 routes calls to and from the mobile station 16 through the appropriate base station 12.

The mobile station 16 communicates with the base station 12 on a communications channel. A communications channel is typically a pair of frequencies, one that transmits and one that receives, used by a mobile station 16 to communicate within a wireless communication system. Some communication channels are for control functions (i.e., control channels) while others are for voice and data communications (i.e., traffic channels). Control channels are generally used to transmit control messages to and from the mobile station 16 which are necessary to maintain service on the communication channel. Traffic channels are used primarily to transmit voice and data signals, however, some control messages are also transmitted on the traffic channels.

The available spectrum for wireless communications is divided into a plurality of "channel bands" each of which comprises a plurality of communications channels. The channel bands are allocated as a unit to the various competing service providers. In a particular geographic area, only one service provider will provide service within any given channel band. However, other service providers may provide service in a different channel band. Thus, at any given location, a mobile station 16 is likely to be within the service area of a plurality of different service providers all of which operate in different channel bands. Since some service providers will offer digital services while others offer only analog services, the mobile station 16 may have a choice between the two types of services. In general, digital service is preferred over analog services in a dual mode mobile station 16 whenever it is available.

For a particular mobile station, the various service providers are classified as either a Home SP, a Partner SP, a Favorite SP, a Neutral SP, or a Forbidden SP based on service provider data stored in the mobile station 16. In general, a list of System ID's (SID) and System Operator Codes (SOC) that correspond to the differing levels of service are stored in the mobile station 16. The service provider SID and/or SOC is broadcast on the control channel. On a DCCH, the SID and possibly an SOC are broadcast. On analog control channels, only the SID is broadcast.

When acquiring service on a control channel, the mobile station 16 will scan the available control channels and make a selection based on the service provider classification. Home SPs and Partner SPs are preferred over all others and are known as acceptable service providers. A Favorite SP has a lower priority than an acceptable SP, but a higher priority than a neutral SP. The mobile station 16 will not register with a Forbidden SP except in emergencies, such as when "911" is dialed. The mobile station 16 attempts to acquire service on a control channel with the highest level of priority.

Two methods are generally employed to obtain service after a call release in a dualmode mobile station 16 when no pointer is present in the call release. The first method, described in IS-136A, typically involves scanning a stored list of digital control channels (DCCH) that previously had provided service to the mobile station 16. If this scan does not produce an acceptable control channel, then the mobile station 16 would scan for analog control channels (ACC). If the mobile station 16 received a digital control channel pointer after obtaining service on an analog control channel, then the mobile station 16 would attempt to obtain service on the digital control channel.

An alternative method which has been recently developed is known as Intelligent Roaming (IR). In this approach, the mobile station initially scans for an analog control channel. Once an analog control channel is found, the mobile station 16 waits for a pre-determined period of time (usually about 5 seconds) for a digital control channel pointer which is transmitted periodically on the analog control channel. Such a pointer would generally indicate that DCCH coverage is available for the mobile station 16. If no digital control channel pointer is received or if no digital control channel is found which is suitable for camping, then the mobile station 16 would determine if the analog channel is suitable for service. This method would not be necessary except for the need to select a preferred service provider. It is undesirable to make an immediate service provider determination on an analog control channel since only the SID is known. If a pointer exists to a digital control channel, then that digital control channel should first be checked to determine the SP type of the band. For example, an analog control channel SID might not be in the mobile station's database, and thus would be a neutral SP. That same analog control channel could point to a digital control channel that has a SOC that is the mobile station's home SOC. Thus, that band would be serviced by a home SP. The goal of a band scan is to find the best SP as quickly as possible, and thus it is necessary to search the next band once the SP for the current band is determined to be unacceptable (i.e., anything other than a home or partner SP). Therefore, it is necessary to wait on an analog control channel until a digital control channel pointer is received to see if it results in an upgrade in the SP definition.

One problem with these approaches is that the mobile station 16 can spend an undesirable amount of time attempting to acquire digital service after call release. This problem occurs particularly in analog-only control channel systems. The time spent looking for a digital control channel is unnecessary since no such channel exists.

To avoid this unnecessary delay, the present invention provides a new method for service acquisition after call release. According to this new method, the mobile station stores protocol version data identifying the capabilities of the mobile switching center 14 when obtaining service on the new traffic channel. The protocol version data of the last-used traffic channel is retained after the traffic channel is released. The protocol version data provides information about the system capabilities of the mobile switching center 14. Specifically, the protocol version data identifies whether the mobile switching center 14 is IS-136 compliant. If the mobile switching center 14 is not IS-136 compliant, then there is no need to search for a digital control channel since DCCH is not supported. Accordingly, the mobile station will immediately acquire service on an analog control channel once a suitable analog channel is found without waiting for a digital channel pointer.

As discussed above, the present invention relies on the transmission of protocol version data from the base station 12 to the mobile station 16 which is stored at the mobile station 16. For purposes of this application, protocol version data means data which provides information about the protocols used on a particular channel or data from which information about the protocols can be implied. The protocol version data is contained in mobile station control messages sent from the base station 12 to the mobile station 16 whenever the mobile station is assigned to a traffic channel.

For example, to establish a call, the base station 12 will send a channel assignment message to the mobile station 16. Once a call is established, the base station 12 may assign the mobile station 16 to a new traffic channel. The procedure for assigning a mobile station 16 to a new traffic channel before a call is terminated is called a hand-off procedure. A hand-off procedure would be invoked, for instance, when the mobile station 16 moves from one cell to another while a call is in progress. Each time that the mobile station 16 is assigned to a traffic channel, whether during a call establishment procedure or during a hand-off procedure, the base station 12 will send mobile station control messages to the mobile station 16. The mobile station control messages include protocol version data so the mobile station 16 can determine what signaling protocols to use on the newly assigned traffic channel.

In dual-mode telephones, four types of communication channels which are used to send messages from a base station to a mobile station: the forward analog control channel (FOCC), the forward analog voice channel (FVC), the forward digital control channel (F-DCCH), and the forward digital traffic channel (F-DTC). The forward analog control channel and forward analog voice channel are used for analog communications. The forward digital control channel and the forward digital traffic channel are used for digital communications. The forward analog control channel and the forward digital control channel are used to send signaling messages from the base station 12 to the mobile station 16 when the mobile station 16 is not currently on a call. On power-up and after each call release, the mobile station 16 attempts to obtain service on either an analog control channel or digital control channel. After finding an acceptable control channel, whether analog or digital, the mobile station 16 will enter the camping state on the control channel. See, for example, IS-136.1A, Section 6.2. The mobile station 16 may leave the camping state to process a number of transactions. For example, the mobile station 16 will leave the camping state in order to place or receive a call.

To establish a call on the network, the mobile station 16 implements a procedure known as a call establishment procedure. During the call establishment procedure, a number of signaling messages are exchanged with the base station 12. One of the signaling messages sent by the base station 12 to the mobile station 16 is the previously mentioned channel assignment message. If the mobile station 16 is on a digital control channel, the channel assignment message will include a protocol version (PV) information element. (See IS-136.1A, Section 6.4.3.1 for Analog Voice Channel Designation and Section 6.4.3.6 for Digital Voice Channel Designation). The protocol version information element is a 4-bit information element used to indicate the base station capabilities. The protocol version information element may take the values indicated in Table 1 below:

TABLE 1

| Value | Function |
| --- | --- |
| 0000 | EIA-553 or IS-54-A |
| 0001 | TIA/EIA 627 |
| 0010 | IS-136 Rev 0 |
| 0100 | IS-136 Rev A |

As seen in Table 1, a value of "0010" in the protocol version information element indicates that the base station 12 is IS-136 compliant. Consequently, the mobile switching center 14 will have one or more control channels. If any value less than 2 (0010 bin) is received in the protocol version information element, the mobile station 16 will know that no digital control channel is available.

In a similar manner, the mobile station 16 may receive a channel assignment message 0n an analog control channel. IS-136.2, Section 3.7.1 describes the signaling formats used on the forward analog control channel. As described in Section 3.7.1.1, a channel assignment message sent by the base station 12 to the mobile station 16 on the analog control channel must include a protocol version indicator (PVI) information element. The PVI is a 1-bit value used to indicate whether TIA/EIA 627 or IS-136 is supported on the assigned channel. A "0" indicates TIA/EIA 627 and a "1" indicates IS-136. The PVI information element should not be confused with the Pv information element used on the digital control channel which is a 4-bit element. While less specific than the PV information element, the PVI information element still indicates whether IS-136 is supported on the assigned channel. If so, then a digital control channel may be present.

The dual-mode mobile station 16 in the present invention will store protocol version data which is extracted from the PV and PVI information elements which are received as part of a channel assignment message. The mobile station 16, for example, may store the value of the PV or PVI information elements in a semi-permanent memory. Alternatively, the mobile station 16 may use the information contained in the PV or PVI information elements to set a flag in the mobile station 16. Such a flag could be used to indicate whether IS-136 is supported on the assigned traffic channel. The manner of storing the protocol version data is not important Virtually any known method for storing information can be used. What is important, is that the protocol version data is stored in some manner after call release so that the protocol version data can be used by the mobile station 16 when attempting to obtain service on a control channel after call release.

Figure 2:
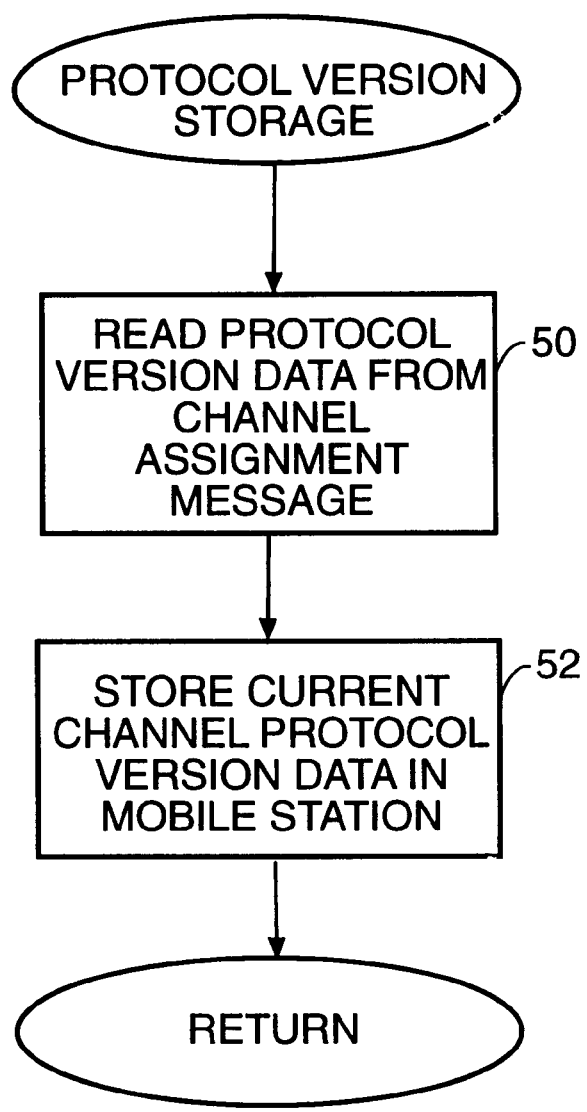
FIG. 2 is a flow diagram of a protocol version storage routine.

FIG. 2 is a flow diagram of a protocol version storage routine used to implement the service acquisition method of the present invention. This routine is invoked each time the mobile station 16 receives a new channel assignment, either during a call establishment procedure or during a hand-off procedure. The mobile station 16 reads the protocol version data from the channel assignment message (block 50). It is understood that the term "channel assignment message" includes any message used to assign the mobile station 16 to a traffic channel, including a hand-off message. Protocol version data is then stored by the mobile unit 16 in a memory device in the mobile station 16. If the protocol version data is already stored in memory, then the mobile station 16 overwrites the previously stored data. Alternatively, the mobile station 16 could store the protocol version data in a database which contains a history of the traffic channels used. For example, the mobile station 16 could store protocol version data for the three most recently used traffic channels.

As described above, once the mobile station 16 establishes a call on a digital traffic channel, the mobile station 16 will have stored protocol version data within the mobile station 16. While the call is in progress, the mobile station 16 may be requested by the base station 12 to switch to a different traffic channel. To make such a request, the base station 12 sends a channel assignment message or hand-off message to the mobile station 16 on the fast associated control channel. The fast associated control channel is simply a logical channel within a traffic channel which can be used for signaling. If the mobile station 16 is currently assigned to a digital traffic channel, one of two types of hand-off messages may be received. A dedicated digital traffic channel hand-off message is sent from the base station 12 to the mobile station 16 to order the mobile station 16 from one digital traffic channel to another digital traffic channel. The digital traffic channel hand-off message is described in IS-136.2-A Section 3.7.3.1.3.2.20. This hand-off message includes the PV information element as previously described. Alternatively, the base station 12 may send the mobile station 16 a hand-off message as described in IS-136.2A, Section 3.7.3.1.3.2.4. This message can be used to order the mobile station 16 from one traffic channel of any type to another traffic channel of any type. This hand-off message includes the PVI information element as previously described.

If the mobile station 16 is on an analog voice channel, the hand-off message will likewise include protocol version data which can be used to determine the capabilities of the newly assigned channel. When the mobile station 16 is ordered to change from one analog traffic channel to another analog traffic channel, the hand-off message will include a PVI information element. IS-136.2A Section 3.7.2.1. If the mobile station 16 is ordered from an analog traffic channel to a digital traffic channel, the hand-off message will include an order field and an order qualifier field. The order field identifies the order type and the order qualifier field qualifies the order to a specific action. See IS-136.2A, Table 3.7.1-1. The order field is a 5-bit field and the order qualifier field is a 3-bit field. The order field will have a value of "01110" for channel designation messages. When the order field has this value, the order qualifier field will indicate whether the digital traffic channel is TIA/EIA 627 compatible or IS-136 compatible.

When a hand-off message is received, the mobile station 16 will examine the appropriate information elements. This information tells the mobile station 16 the protocol supported on the newly assigned channel. Protocol version data is then stored in the mobile station 16 replacing the data previously stored.

Based on the foregoing, it is apparent that the mobile station 16 will always have knowledge about the mobile switching center 14 capabilities based on the protocol version of the last used traffic channel. Each time a new channel designation is received, the information previously stored is updated to reflect the capabilities of the newly assigned channel. This information is retained by the mobile station 16 after the call is released.

Figure 3:
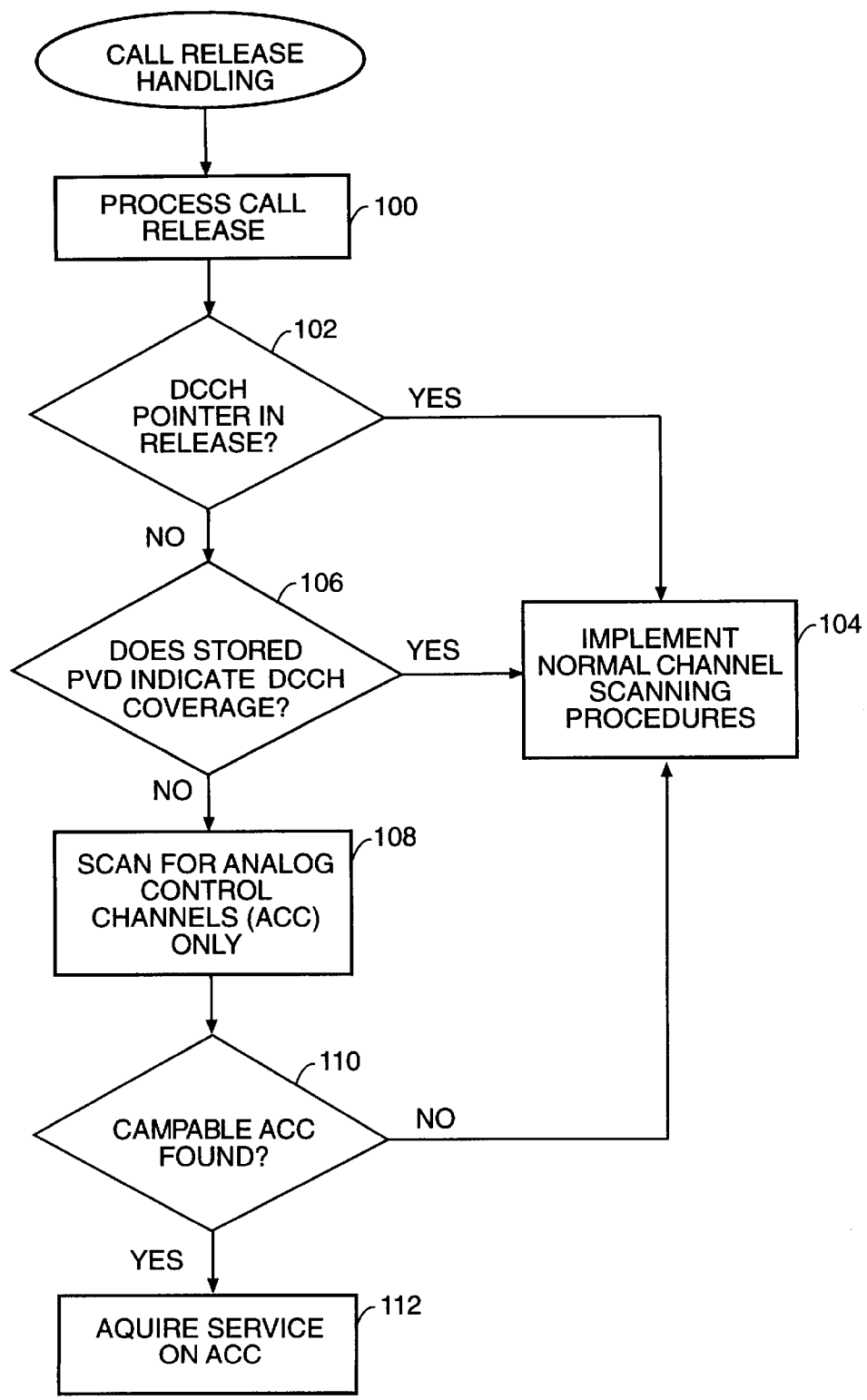
FIG. 3 is a flow diagram of a service acquisition routine.

FIG. 3 shows a flow diagram illustrating the service acquisition method of the present invention. In block 100, a call release message is received by the mobile station and processed. The details of the call release process are not important to the present invention. In block 102, the mobile station 16 determines whether a digital control channel (DCCH) pointer is present in the call release message. If a digital control channel pointer is found, the mobile station 16 starts its normal band scanning procedures. The band scanning procedures for finding a control channel in the 800 MHz and 1900 MHz bands are described in IS-136A and TIA's Intelligent Roaming specification. If the call release method does not include a digital control channel pointer, the mobile station 16 will then use the stored protocol version data to determine whether a digital control channel is available. If the stored protocol version data indicates that the last used traffic channel was IS-136 capable, the mobile station 16 will start the normal band scanning procedures (block 104). If the protocol version data stored in the local station indicates that the last used traffic channel is not IS-136 capable, then no digital control channel will be available. In this case, the mobile station 16 will scan for analog control channels only (block 108). If an acceptable analog control channel is found (block 110), the mobile station 16 will immediately acquire service on the analog control channel (block 112). On the other hand, if no capable analog control channel is found, the normal band scanning procedures are used to find an acceptable control channel (block 104).

The primary advantage of the present invention is that it will significantly shorten the amount of time it takes to establish service after call release in an analog-only system. The mobile station 16 will choose information about the current wireless system obtained from the voice channel to determine if a search for digital control channel service is necessary. This will significantly reduce the time that the mobile station 16 spends searching for service when only analog control channels are available.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:
1. A method used by a dual mode mobile station to acquire service on a control channel in a mobile wireless communication system, comprising
   a) storing protocol version data in said mobile station indicating the protocol version of the last-used traffic channel;
   b) scanning by said mobile station for an analog control channel;
   c) thereafter, either:
      i) waiting for digital control channel information on the analog control channel if the stored protocol version data indicates that the last-used traffic channel was in a digital control channel coverage zone; or
      ii) acquiring service on said analog control channel without waiting for digital control channel information if the stored protocol version data indicates that the last used traffic channel was not in a digital control channel coverage zone.

2. The method according to claim 1 further including the step of transmitting protocol version data from a base station to said mobile station.

3. The method according to claim 2 wherein said protocol version data is contained in a mobile station control message.

4. The method according to claim 3 wherein said protocol version data is contained in a call assignment message.

5. The method according to claim 4 wherein said protocol version data is contained in a hand-off message.

6. A method used by a dual mode mobile station to acquire service on a control channel in a mobile wireless communication system while operating in an operating mode allowing both digital and analog communications, comprising:

a) storing protocol version data in said mobile station indicating the protocol version of the last-used traffic channel;

b) determining based on said stored protocol version data whether the mobile station is in a digital control channel coverage zone; and c) if the mobile station is not in a digital control channel coverage zone, selecting an analog control channel without waiting for digital control channel information.

7. The service acquisition method according to claim 6 further including the step of selecting a digital control channel if the mobile station is in a digital control channel coverage zone.

8. The method according to claim 6 further including the step of transmitting protocol version data from a base station to said mobile station.

9. The method according to claim 8 wherein said protocol version data is contained in a mobile station control message.

10. The method according to claim 9 wherein said protocol version data is contained in a call assignment message.

11. The method according to claim 10 wherein said protocol version data is contained in a hand-off message.

\* \* \* \* \*

UNITED STATES PATENT AND TRADEMARK OFFICE
CERTIFICATE OF CORRECTION

PATENT NO. : 6,026,300
DATED : Feb. 15, 2000
INVENTOR(S) : Hicks

It is certified that error appears in the above-identified patent and that said Letters Patent is hereby corrected as shown below:

On the title page: Item [73] Assignee: should read -- Ericsson, Inc., Research Triangle Park, NC --.

Signed and Sealed this

Sixteenth Day of May, 2000

Attest:

Q. TODD DICKINSON

*Attesting Officer*          *Director of Patents and Trademarks*